US010395180B2

(12) United States Patent
Wang et al.

(10) Patent No.: US 10,395,180 B2
(45) Date of Patent: *Aug. 27, 2019

(54) PRIVACY AND MODELING PRESERVED DATA SHARING

(71) Applicant: International Business Machines Corporation, Armonk, NY (US)

(72) Inventors: Jun Wang, White Plains, NY (US); Jinfeng Yi, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 14/667,163

(22) Filed: Mar. 24, 2015

(65) Prior Publication Data

US 2016/0283735 A1    Sep. 29, 2016

(51) Int. Cl.
*G06N 20/00* (2019.01)
*G06F 21/62* (2013.01)

(52) U.S. Cl.
CPC ......... *G06N 20/00* (2019.01); *G06F 21/6254* (2013.01)

(58) Field of Classification Search
CPC ... G06N 99/005; G06F 21/6254; G06F 17/11; G06F 21/552; G06F 3/0619
See application file for complete search history.

(56) References Cited

U.S. PATENT DOCUMENTS 5,694,484 A * 12/1997 Cottrell ............... G06T 5/003
    382/167
7,269,578 B2 * 9/2007 Sweeney ........... G06F 17/30424
    705/64

(Continued)

FOREIGN PATENT DOCUMENTS

WO    WO2014/049605        4/2014
WO    WO-2015057854 A1 *  4/2015  ......... G06F 21/6245

OTHER PUBLICATIONS

Andrew B. Goldberg, Xiaojin Zhu, Benjamin Recht, Jun-Ming Xu, Robert Nowak, "Transduction with Matrix Completion: Three Birds with One Stone", Dec. 6, 2010. Proceeding NIPS'10 Proceedings of the 23rd International Conference on Neural Information Processing Systems, pp. 1-9.*

(Continued)

*Primary Examiner* — Kamran Afshar
*Assistant Examiner* — Ying Yu Chen
(74) *Attorney, Agent, or Firm* — Scully, Scott, Murphy & Presser, P.C.; Daniel P. Morris, Esq.

(57) ABSTRACT

A system, method and computer program product for generating a classification model using original data that is sensitive or private to a data owner. The method includes: receiving, from one or more entities, a masked data set having masked data corresponding to the original sensitive data, and further including a masked feature label set for use in classifying the masked data contents; forming a shared data collection of the masked data and the masked feature label sets received; and training, by a second entity, a classification model from the shared masked data and feature label sets, wherein the classification model learned from the shared masked data and feature label sets is the same as a classification model learned from the original sensitive data. The sensitive features and labels cannot be reliably recovered even when both the masked data and the learning algorithm are known.

15 Claims, 7 Drawing Sheets

(56) References Cited

U.S. PATENT DOCUMENTS

| | | | |
|---|---|---|---|
| 2009/0187522 A1* | 7/2009 | Fung | G06F 21/6254 706/46 |
| 2011/0068268 A1* | 3/2011 | Heidari | G01N 21/3581 250/330 |
| 2012/0159637 A1* | 6/2012 | Dove | G06F 21/6254 726/26 |
| 2013/0054259 A1* | 2/2013 | Wojtusiak | G06Q 10/10 705/2 |
| 2013/0067595 A1 | 3/2013 | Pierre et al. | |
| 2014/0244148 A1 | 8/2014 | Horvitz et al. | |

OTHER PUBLICATIONS

Ricardo S. Cabral, Fernando De la Torre, João P. Costeira, Alexandre Bernardino, "Matrix Completion for Multi-label Image Classification", Dec. 12, 2011. Proceeding NIPS'11 Proceedings of the 24th International Conference on Neural Information Processing Systems, pp. 1-9.*

Noman Mohammed, Benjamin C. M. Fung, Ke Wang, Patrick C. K. Hung, "Privacy-Preserving Data Mashup", Mar. 2009, EDBT 2009, pp. 228-239.*

Dakshi Agrawal and Charu C. Aggarwal, "On the Design and Quantification of Privacy Preserving Data Mining Algorithms", May 1, 2001, PODS '01 Proceedings of the twentieth ACM SIGMOD-SIGACT-SIGART symposium on Principles of database systems, pp. 247-255.*

Jinfeng Yi, Jun Wang, and Rong Jin, "Privacy and Regression Model Preserved Learning", Jul. 2014, Proceedings of the Twenty-Eighth AAAI Conference on Artificial Intelligence, p. 1341-1347. (Year: 2014).*

List of IBM Patents or Patent Applications Treated as Related.

Avidan et al., "Blind Vision," In ECCV (3) European Conference on Computer Vision, pp. 1-13, May 2006.

Cabral et al., "Matrix Completion for Multi-label Image Classification," Advances in Neural Information Processing Systems 24: 25th Annual Conference on Neural Information Processing Systems 2011, Proceedings of a meeting held Dec. 12-15, 2011, Granada, Spain, Neural Information Processing Systems (NIPS).

Candes et al., "Matrix Completion With Noise," Proceedings of the IEEE, vol. 98, Issue 6, Mar. 18, 2009.

Candes et al., "The Power of Convex Relaxation: Near-Optimal Matrix Completion," IEEE Transactions on Information Theory, vol. 56, No. 5, May 2010.

Chapelle et al., "Support Vector Machines for Histogram-Based Image Classification," IEEE Transactions on Neural Networks, vol. 10, No. 5, Sep. 1999.

Chen et al., "Privacy preserving data classification with rotation perturbation," Fifth IEEE Conference on Data Mining, Nov. 27-30, 2005.

Chen et al., "Image Categorization by Learning and Reasoning with Regions," Journal of Machine Learning Research 5 (2004), Submitted Jul. 2003, Revised Nov. 2003, Published Aug. 2004.

Dwork, "Differential Privacy,"33rd International Colloquium, 2006, Venice, Italy, Jul. 10-14, 2006, Proceedings ICALP, Part II.

Dwork et al., "Calibrating Noise to Sensitivity in Private Data Analysis," Theory of Cryptography, Third Theory of Cryptography Conference, TCC 2006, New York, NY, Mar. 4-7, 2006, Proceedings, Springer.

Gambs et al., "Privacy-preserving boosting," Data Min Knowl Disc (2007) 14:131-170, Published online: Jan. 26, 2007, Springer Science+ Business Media, LLC 2007.

Goldberg et al, "Transduction with Matrix Completion: Three Birds with One Stone," Neural Information Processing Systems, Advances in Neural Information Processing Systems 23, 24th Annual Conference on Neural Information Processing Systems 2010, Dec. 6-9, 2010, Vancouver, BC, Canada, in NIPS 2010.

Huang et al., "Outsourced Private Information Retrieval," WPES'13, In Proceedings of the 12th Annual ACM Workshop on Privacy in the Electronic Society, Nov. 4, 2013, Berlin, Germany.

Keshavan et al., "Matrix Completion from Noisy Entries," Journal of Machine Learning Research 11 (2010) Submitted Apr. 2010, Revised Apr. 2010, Published Jul. 2010, retrieved Apr. 9, 2012.

McSherry, "Privacy Integrated Queries," SIGMOD Conference '09, Jun. 29-Jul. 2, 2009, Providence, Rhode Island.

McSherry et al., "Mechanism Design via Differential Privacy," In FOCS, 2007, Proceedings of teh 48th Annual IEEE Symposium on Foundations of FOCS '07, Oct. 21, 2007 to Oct. 23, 2007.

Srebro et al., "Maximum-Margin Matrix Factorization," Advances in Neural Information Processing Systems (NIPS) 17, 2005, Dec. 2004 conference.

Upmanyu et al., "Blind Authentication: A Secure Crypto-Biometric Verification Protocol," IEEE Transactions on Information Forensics and Security, vol. 5, No. 2, Jun. 2010.

Vaidya et al., "Privacy Preserving Naive Bayes Classifier for Vertically Partitioned Data," Journal SIAM International Conference on Data Mining, Lake Buena Vista, Florida, Apr. 22, 2004.

Vailaya et al., "Image Classification for Content-Based Indexing," IEEE Transactions on Image Processing, vol. 10, No. 1, Jan. 2001.

Verykios et al., "State-of-the-art in Privacy Preserving Data Mining," SIGMOD Record, vol. 33, No. 1, Mar. 2004.

Wright et al., "Robust Principal Component Analysis: Exact Recovery of Corrupted Low-Rank Matrices via Convex Optimization," Advances in Neural Information Processing Systems 22: 23rd Annual Conference on Neural Information Processing Systems 2009, Vancouver, British Columbia, Canada, Dec. 7-10, 2009, in NIPS.

Yao, "How to generate and exchange secrets," 27th Annual Symposium on Foundations of Computer Science, 1986, Toronto, ON, Canada, Oct. 27-29, 1986, in FOCS.

Yu et al., "Privacy-Preserving SVM Classification on Vertically Partitioned Data," In PAKDD, Apr. 9-12, 2006 Singapore.

* cited by examiner

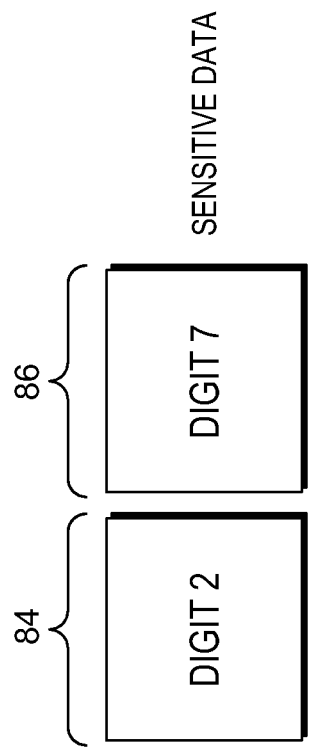
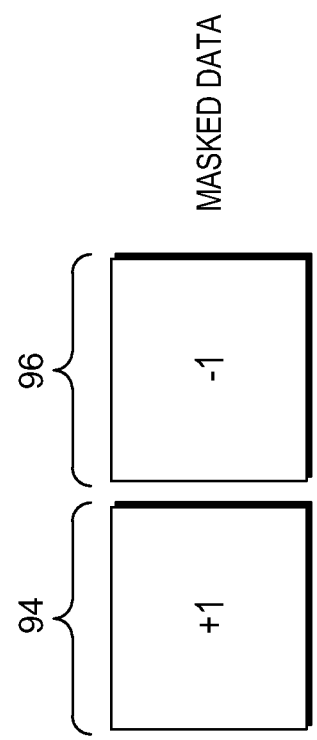
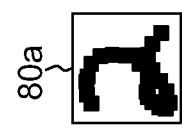 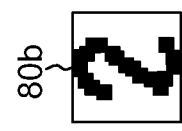 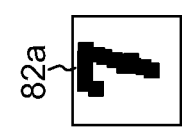 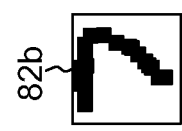
 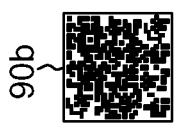  
FIG. 5A
FIG. 5B

10,395,180 B2

PRIVACY AND MODELING PRESERVED DATA SHARING

FIELD

The present disclosure relates generally to preserving privacy of data to be shared and more particularly, to a system and method for sharing sensitive data with the properties of privacy-preserving and model-preserving.

BACKGROUND

A set of data owners have some sensitive data. Each owner's data is not enough for learning an accurate model. They want to share the data to a pool for modeling. But they cannot directly release the data due to privacy issues.

The preserving of the privacy of data that is to be shared to a pool for modeling is a general problem in the industry as it widely-appeared in many domains, esp., for example, health care; medical records; economics: business reports; homeland security: face images, fingerprints, etc.

Currently, while the providing of data anonymously is one way to share private data, there is no guarantee that anonymity can protect privacy.

For example, it has been demonstrated that even user's of the popular program NETFLIX® that obtain data anonymously, can possibly be identified users of the Netflix data by linking them to IMDB dataset. Moreover, more than 87% of American citizens can be uniquely identified by just observing their gender, ZIP code and birthdates. Basically, a person's privacy data is not as safe as they imagine.

As a further example of a prior art system 10 for sharing medical data, FIG. 1 shows a plurality of hospitals 12a, . . . , 12n that each provide respective medical data, e.g., medical records 15a, . . . , 15n for a few patients who have a particular disease, to a data center, employing a computing machine 19, so that the medical data can be analyzed for the disease. In such a scenario, a learner 18 is solicited to analyze the data. However, as it is the case that the medical records are sensitive and private it is desirable that the records' contents be blind to a learner. In a more strict sense, the medical records may not even be allowed to be released out of the hospital.

Thus, it is the case that a set of data owners have some sensitive data. Each owner's data is not enough for learning an accurate model, and it is advantageous to share the data to a pool for modeling. But they cannot directly release the data due to privacy issues.

SUMMARY

There is provided a system, method and computer program product for sharing sensitive data with the properties of privacy-preserving and model-preserving.

In one aspect, the system, method and computer program product guarantees that the shared data is safe, i.e., the shared data cannot be used to recover the original (sensitive) data.

In a further aspect, the system, method and computer program product guarantees that the model learned from the shared data is the same as the model learned from the original (sensitive) data.

Moreover, the system, method and computer program product is configured to cast the data sharing problem into a convex-optimization problem, which can be solved very efficiently.

In one aspect there is provided a method for generating a classification model using original data that is sensitive or private to a data owner. The method comprises: receiving, from one or more first entities, a masked data set, each data set from an entity having masked data corresponding to the original sensitive data, the masked data set further including a masked feature label set for use in classifying the masked data contents; forming a shared data collection of the masked data and the masked feature label sets received from the first entities; and training, by a second entity, a classification model from the shared masked data and feature label sets, the model being a classification model configured to classify original sensitive data contained in masked data sets received from the entities, wherein the classification model learned from the shared masked data and feature label sets is the same as the model learned from the original sensitive data.

In a further aspect, there is provided method for encrypting original data that is sensitive or private to a data owner. The method comprises: accessing, from a computing device associated with a first entity, one or more records having original data sensitive to a data owner; generating an original data matrix of original data content including sensitive features and a corresponding feature label set for use in classifying the feature data; generating a random feature matrix sharing the same subspace as the sensitive features of original data matrix; computing an intermediate data structure as a product of the original data feature set matrix and the generated random feature matrix; computing one or more further intermediate data structures; forming a convex optimization problem having an objective function based on the intermediate data structure, the original data matrix of original data content, the corresponding feature label set, and the one or more further intermediate data structures; and solving the convex optimization problem, the solving generating the masked matrix data feature set and masked feature label set.

In a further aspect, there is provided a system for generating a classification model using original data that is sensitive or private to a data owner. The system comprises: a memory storage device; a hardware processor in communication with the memory storage device, the hardware processor configured to perform a method to: receive, from one or more first entities, a masked data set, each data set from an entity having masked data corresponding to the original sensitive data, the masked data set further including a masked feature label set for use in classifying the masked data contents; form a shared data collection of the masked data and the masked feature label sets received from the first entities; and train, by a second entity, a classification model from the shared masked data and feature label sets, the model being a classification model configured to classify original sensitive data contained in masked data sets received from the entities, wherein the classification model learned from the shared masked data and feature label sets is the same as the model learned from the original sensitive data.

Furthermore, there is provided a system for encrypting original data that is sensitive or private to a data owner. The system comprises: a memory storage device; a hardware processor in communication with the memory storage device, the hardware processor configured to perform a method to: access, from a computing device associated with a first entity, one or more records having original data sensitive to a data owner; generate an original data matrix of original data content including sensitive features and a corresponding feature label set for use in classifying the feature data; generate a random feature matrix sharing the same subspace as the sensitive features of original data matrix; compute an intermediate data structure as a product of the original data feature set matrix and the generated random feature matrix; compute one or more further intermediate data structures; form a convex optimization problem having an objective function based on the intermediate data structure, the original data matrix of original data content, the corresponding feature label set, and the one or more further intermediate data structures; and solve the convex optimization problem, the solving generating the masked matrix data feature set and masked feature label set.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 5A shows example sensitive images from which original feature matrices data set would be derived;

FIG. 5B shows for the example images of FIG. 5A, resulting images encrypted according to the method 100 of FIG. 4;

DETAILED DESCRIPTION

Figure 1:
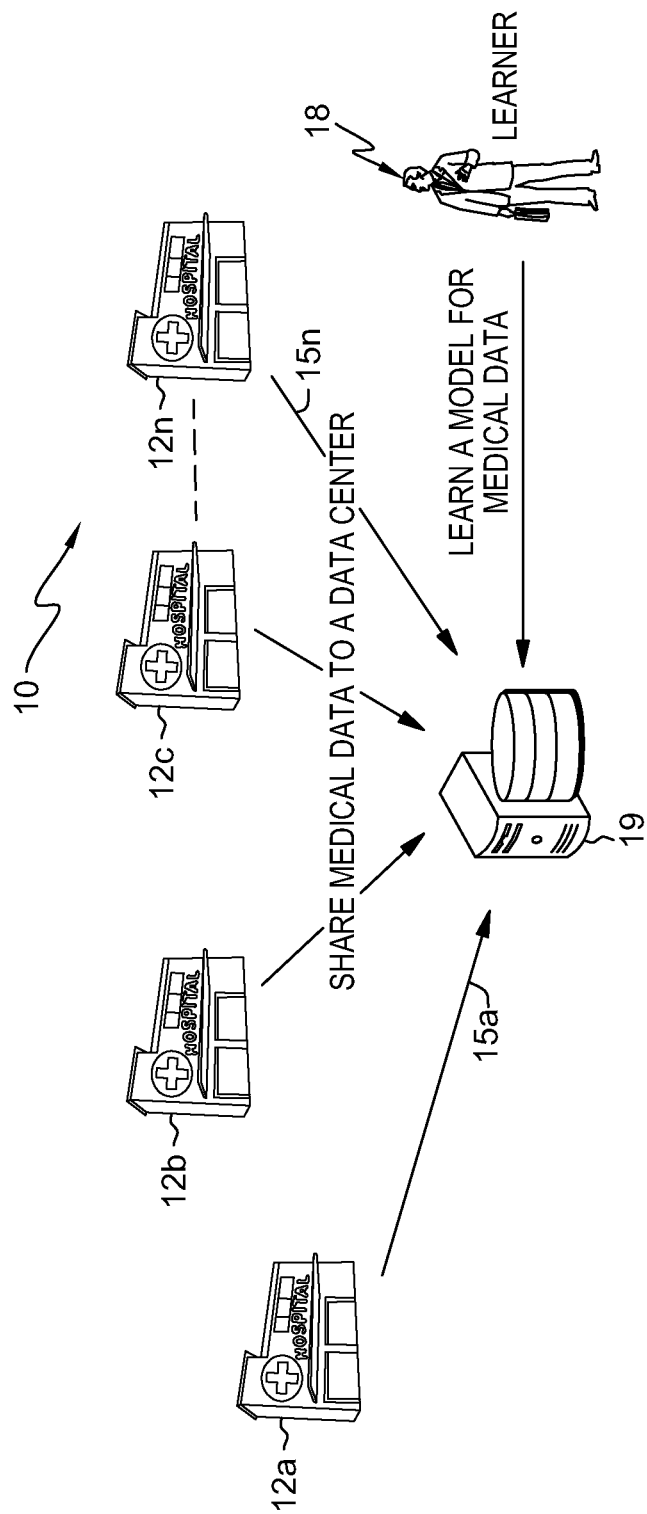
FIG. 1 shows a prior art environment for sharing medical data records used for generating a classification model in the healthcare domain.
Figure 2:
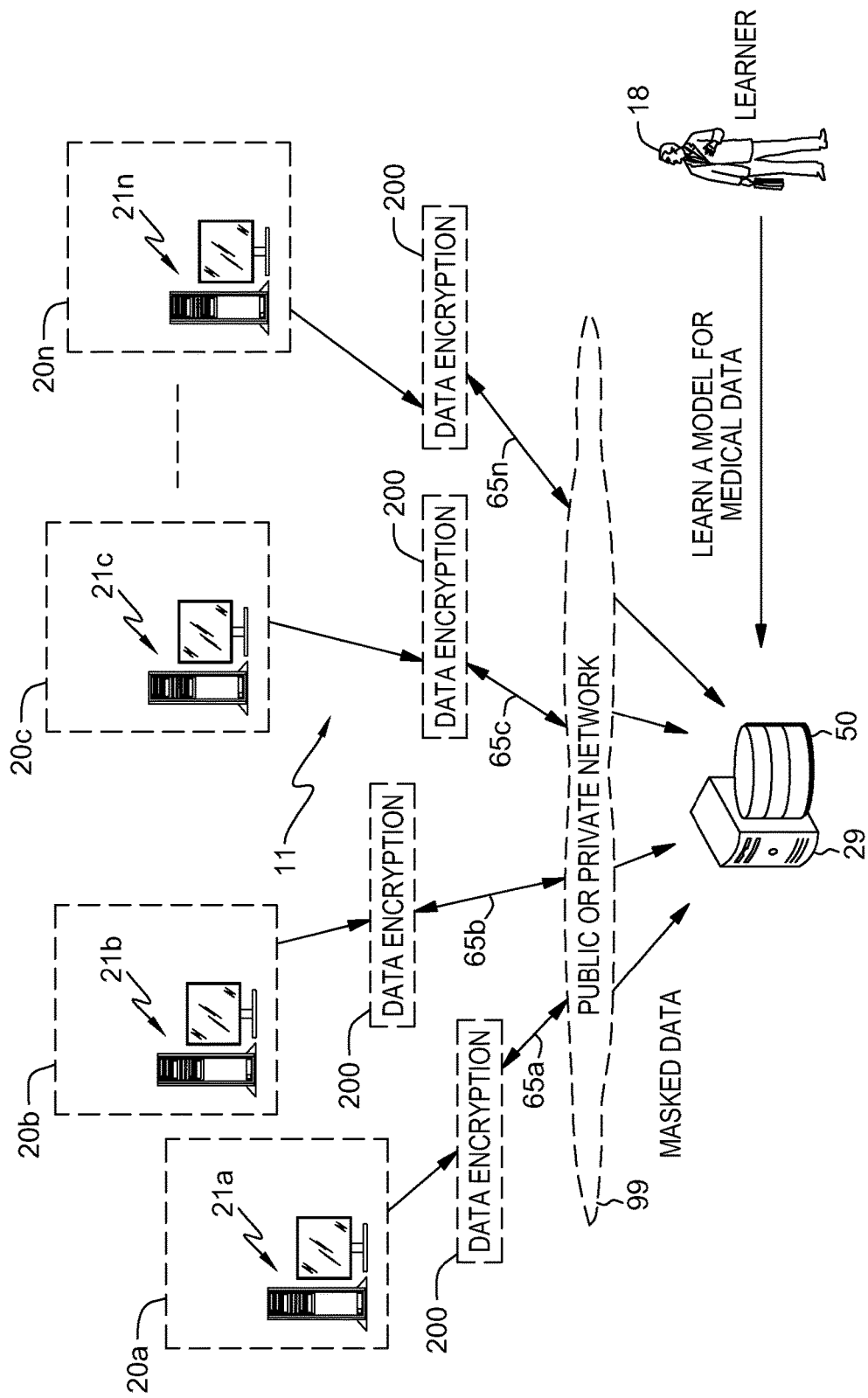
FIG. 2 depicts a block diagram of an exemplary "privacy and model-preserving" system in one embodiment.

A system, method and computer program product for privacy and modeling preserved data sharing is now described in view of FIG. 2.

As shown in FIG. 2, there is provided a "privacy and model preserving" system 11 implementing machine learning methods that allows an entity, e.g., a learner 18, to build a classification model that can accurately classify shared masked sensitive data received, accessed or obtained from entities 20a, 20b, . . . , 20n, wherein it is guaranteed that the classification model learned from the shared data is the same as the model learned from the original (sensitive) data. Additionally, the system 11 guarantees that the shared data is safe, i.e., the shared data cannot be used to recover the original (sensitive) data.

In one embodiment, the system 11 casts the data sharing problem into a convex-optimization problem, which can be solved very efficiently.

In one example, entities using system 11 may include, for example, in a domain of healthcare, hospitals 20a, 20b, . . . 20n or like entities that are in the healthcare domain and provide health services to private individuals. It is understood that the "privacy preserving" method employed herein are not specific to any one particular application or domain, but can apply to any entity, private, e.g., commercial entities such as corporations, or hospitals, banks, etc., or public entities (e.g., government) that deals with receives and maintains private and sensitive data.

Generally, the concern regarding data practices as they pertain to privacy data appears in many domains. Thus, the implementation of the "privacy and model preserving" system 11 and the methods describe herein, may be applicable in such domains including, but not limited to: health care (e.g., medical records); economics (e.g., business reports); homeland security: (face images, fingerprints, etc.). For purposes of discussion, it may be assumed entities 20a, 20b, . . . , 20n are a series of hospitals, and would like to encrypt the sensitive data from each owner using the proposed framework.

In one embodiment, each entity 20a, 20b, . . . 20n maintain a data storage device and/or database of user records, wherein the data stored is private and/or sensitive to the data owners.

In one embodiment, the private and/or sensitive data may comprise any media, text, video, images, scanned media, 20a, 20b, . . . 20n, and may have facility to generate the masked data from the sensitive data contained in the user records.

That is, in one embodiment of the "privacy and model preserving" system 11, each entity premises 20a, 20b, . . . , 20n may provide a respective computer system 21a, 21b, . . . , 21n in which the masked data set is generated by a privacy and modeling preserved framework 200 that solves a convex optimization problem as described herein. That is, each computer system 21a, 21b, . . . , 21n may implement a computing device of sufficient processing capability to solve the problem used in generating a masked data set from the sensitive data.

As described herein, the solving of the convex optimization problem generates a masked feature data matrix "C" and associated feature label set "d" that guarantees the property of the privacy preserving (i.e., the true original sensitive data can not be recovered), in addition to ensuring that the masked data is significantly different from the sensitive data.

In one embodiment, as shown in FIG. 2, the generating of a matrix data feature set C and labels set d provides a data encryption function in which the original sensitive data could never be obtained. Thus, in FIG. 2, each entity's computing device 21a, 21b, . . . , 21n employs the like software functions, routines and procedures of the privacy and modeling preserved framework 200 to generate respective masked data and masked label sets 65a, 65b, . . . , 65n.

It is understood that the entity 20a, 20b, . . . , 20n (or trusted agent associated with the entity) may employ the computing device 21a, 21b, . . . , 21n used to generate the masked feature data and label data set. For example, a remote located trusted third party may receive the original sensitive data and implement the data encryption function of the privacy and model preserving framework to generate masked feature data and label sets 65a, 65b, . . . , 65n.

It is understood that the entities 20a, 20b, . . . , 20n (or trusted agent associated with the entity) may communicate the generate masked feature data and label sets 65a, 65b, . . . , 65n for collection at a data center employing a computing or processing device 29 and associated memory storage device 50, the processing device 29 configured as a model building tool that may be implemented by a learner for use in building a classification model based on the generated masked feature and label data sets from 20a, 20b, . . . , 20n. In one embodiment, the generated masked feature data and label sets 65a, 65b, . . . , 65n are an encryption of the original sensitive data as a result of solving the convex-optimization problem. As such, entities may communicate the masked feature data and label sets 65a, 65b, . . . , 65n to the learner over a data network 99 such as a private or public network such as the Internet.

Figure 3:
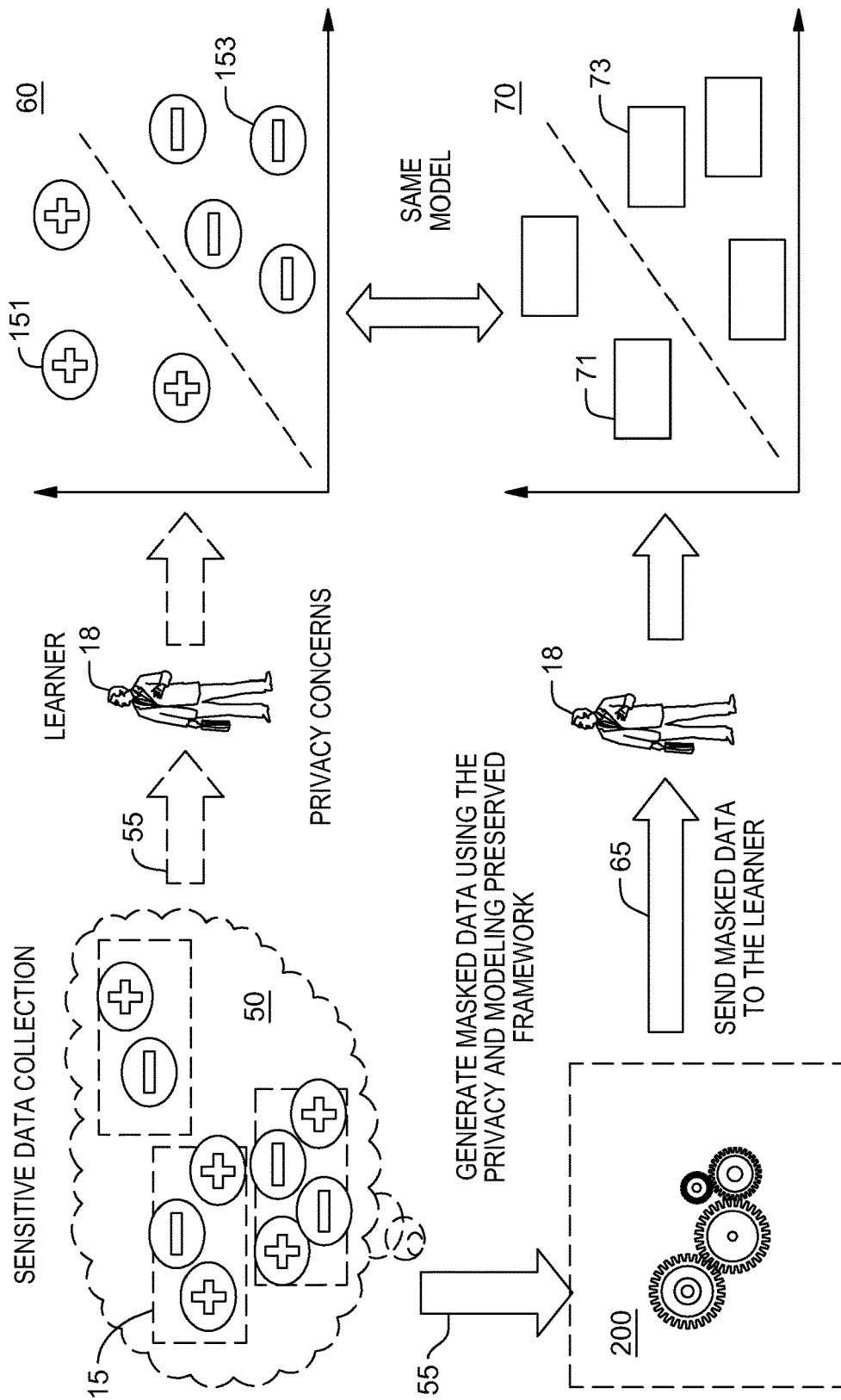
FIG. 3 shows conceptually a "privacy and model-preserving" method for learning a classification model using masked data corresponding to original sensitive and private data.

FIG. 3 conceptually depicts a general method 40 implemented at computing or processing device 29 for modeling and classifying of privacy data. In FIG. 3, there is depicted a shared data collection 50 in which records may contain private and/or sensitive data, e.g., shared medical records data 15 received from a plurality of medical offices or hospitals. As depicted in FIG. 3, in the typical generation of a classification model using the shared data, each record 15 would have an associated classification assigned thereto, e.g., both a sensitive (private) data portions (indicated by a negative classification label "−", e.g., belonging to a first class) and unsensitive data portions (indicated by a positive classification label "+", e.g., belonging to a second class) that could be used, e.g., in the evaluation of a disease or illness. This sensitive data 55 is shown being received or collected by the "learner" (a modeler) 18, or like entity such as a remotely located data scientist, charged with viewing the records for the disease analyzing and generating a classification model 60 based on the data, e.g., in which a positive classification labels 61 or a negative classification label 63 are to be attached. This provision of data 55 to the learner is shown as potentially raising privacy concerns.

Thus, in the generation of a model from the collected data 50, privacy concerns are raised as shown by the model depicting the sensitive data portions being modeled. The sensitive data to be preserved include but not limited to: face images, fingerprints, medical records, personal history, browsing history, etc., any data that could be subject to data analysis.

However, in one aspect of the disclosure, for the sensitive data 55, a further method for generating corresponding masked data 65 implemented by a privacy and modeling preserved framework 200 is provided that operates as described herein below. Thus, as shown in FIG. 3, after generating the masked data 65, the masked data is communicated to the learner (e.g., data scientist, or like entity) 18 charged with viewing, analyzing the records and for generating the classification model. The model 70 resulting from using the generated masked data 65 as conceptually depicted in FIG. 3, shows the same classification model as model 60 generated using the privacy data however, with no sensitive subject matter revealed. Thus, as shown, the classification labels 71 and 73 corresponding to labels 61, 63 are not revealed and remain hidden.

The classification model 70 built and refined from the generated masked feature and label data sets may be continuously updated as new records are processed according to the privacy.

More importantly, the privacy and modeling preserved framework 200 described herein and use of masked data satisfies two properties: 1) Model preserving: the classification model 70 learned from the masked data in FIG. 3 is guaranteed to be the same as the model 60 learned from the sensitive data; and 2) Privacy preserving: original sensitive data 55 cannot be recovered even when both the masked data 65 and the modeling algorithm 70 are known.

In the general framework 200 for privacy and classifier preserved matter concealing, received inputs include a set I of n sensitive items to be classified, e.g., a set I={$I_1$, . . . ,$I_n$} is the set of n sensitive images to be classified, and includes a matrix A=($a_1$, . . . , $a_n$)$^T \in R^{d \times n}$ where A is the set of features A $\in R^{d \times n}$ (e.g., a matrix of size (d×n)) where d is the number of features, e.g, a visual feature, an image, a number, etc. and n are the number of items being classified.

In one embodiment, the feature set matrix A=($a_1$, . . . $a_n$)$^T \in R^{n \times (d+1)}$ be a n×(d+1) matrix where its first d columns are the visual features of the n images and its last column is a vector of all 1s. That is, the last column may be introduced in order to capture a bias term of the classification model.

Received inputs further include the data representing sensitive feature and labels to be classified: where b=[$b_1$ . . . $b_n$]$^T \in \{-1,+1\}^n$ where b $\in R^{1 \times n}$ is the set of corresponding labels for the features (e.g., a class label vector of size (1×n)). In one aspect of the disclosure, based on the received input data A and labels b the framework for privacy and classifier of sensitive matter performs learning of a corresponding masked feature set C and corresponding labels d used to train the classifier model wherein: C $\in R^{d \times m}$ and d $\in R^{1 \times m}$.

In the classifier, it is first assumed that matrix A can be well-approximated by a low-rank matrix. For example, in image analysis, it is a widely-used assumption that images usually lie on some low-dimensional subspace or manifold. Specifically, we assume that there exist a d×n low-rank soft feature matrix $\tilde{A}$ with rank($\tilde{A}$)=min(d, n). The observed feature matrix A is obtained by adding i.i.d. Gaussian noise to the entries of soft features $\tilde{A}$: A=$\tilde{A}$+$\varepsilon_A$, where $\varepsilon_{ij}$ : N(0, $\sigma^2_\varepsilon$) and i and j are indexes into the matrix. There is then defined the soft class labels $\tilde{b}$=($b^o_1$, . . . , $b^o_n$)$^T$ as $\tilde{b}$=$\tilde{A}$w, where w $\in R^{d+1}$ is an underlying linear classifier, and the actual label $b_i$ is generated via a sigmoid function: Pr($b_i|b^o_i$)=1/(1+exp(−$b_i \tilde{b}_i$)). Since $\tilde{A}$ and $\tilde{b}$ are the denoised features and class labels of the sensitive data (e.g., images), the problem of learning the classifier of sensitive images is essentially the problem of learning vector w from $\tilde{A}$ and $\tilde{b}$.

To preserve the privacy and classifier of the sensitive items, e.g., images, the method invokes functions to learn a new feature matrix C $\in R^{m \times d}$ and a m-dimensional class label vector d such that (i) the linear classifier learned by C and d is the same as the linear classifier learned by $\tilde{A}$ and $\tilde{b}$, and (ii) $\tilde{A}$ and $\tilde{b}$ cannot be reliably recovered even if both C and d are observed. It is noted that the new feature matrix C may be formed as C $\in R^{m \times (d+1)}$. To this end, the matrix completion based framework invokes functions to learn C and d without learning the classifier vector w explicitly. Then, the owners of sensitive images can safely release the masked images C and their class labels d to a learner without taking privacy risks.

In the proposed framework for classifier and privacy preserved learning, as the soft feature $\tilde{A}$ is a low-rank matrix and the soft label $\tilde{b}$=$\tilde{A}$w is a linear combination of $\tilde{A}$, it is evident that the matrix [$\tilde{b}^T$; $\tilde{A}^T$] is also of low-rank. Note that the target feature matrix C and label vector d share the same classification model as $\tilde{A}$ and $\tilde{b}$, it is verified that if $\tilde{A}$ is a low-rank matrix, then the combined matrix $$\Gamma_0 = \begin{bmatrix} \tilde{b}^T & d^T \\ \tilde{A}^T & C^T \end{bmatrix}$$

is also of low rank.

That is, there is given a Lemma 1 proof indicating: if rank $$\left(\begin{bmatrix} b \\ A \end{bmatrix}\right) = \text{rank}\left(\begin{bmatrix} b & d \\ A & C \end{bmatrix}\right),$$

then the masked data C and d shares the same model as the sensitive data A and b. Since rank $$\left(\begin{bmatrix} b & d \\ A & C \end{bmatrix}\right) \geq \text{rank}\left(\begin{bmatrix} b \\ A \end{bmatrix}\right),$$

rank the rank of matrix $$\begin{bmatrix} b & d \\ A & C \end{bmatrix}$$

is minimized to learn masked data C and d.

In one embodiment, thus, masked senstive data (e.g., images) C and their class labels d may be found that minimize the rank of the combined matrix $\Gamma_0$. However, in order to guarantee that the masked items C and their class labels d share the same classifier as the sensitive images $\tilde{A}$ and $\tilde{b}$, its sufficient condition that the columns of masked items $\Gamma_m = [d;C]$ lie in the subspace spanned by the column space of sensitive items $\Gamma_s = [\tilde{b}; \tilde{A}]$ is ensured. In other words, there exists a n×m matrix P satisfying:

$$\Gamma_m = \Gamma_s P$$

where a size of $\Gamma_s$ and $\Gamma_m$ are (d+2)*n and (d+2)*m, respectively. To provide a solution, a random feature matrix P is generated that shares the same subspace as the noisy sensitive features of matrix A. To this end, in one embodiment, the method performs generating a normalized n×m random matrix P whose entries take values $+1/\sqrt{m}$ and $-1/\sqrt{m}$, e.g., with equal probability ½. There is then transformed the (n×d) matrix A to a m×(d+1) matrix $\tilde{C}$, based on the random matrix P according to:

$$\tilde{C} = AP.$$

In one embodiment, a random initialization of the masked data C ensures that in transformation of the feature matrix A to a masked feature data matrix $\tilde{C}$, the property of the privacy preserving (i.e., the true sensitive data can not be recovered) is guaranteed, in addition to ensuring that the masked data is significantly different from the sensitive data.

Next, there is performed normalizing the projection matrix P to ensure that the entries in matrices $\tilde{C}$ and A have roughly the same magnitudes. In alternate embodiment, it is understood that the number of masked images m can be either smaller than, equal to, or larger than the number of sensitive images n. However, it is noted that mapping n sensitive images to a less number of masked images is beneficial to the goal of classifier and privacy preserving, for the reason that the more data to be disclosed, the more noise need to be added to each data entry for privacy protection. Thus, by sharing a smaller number of masked images to the learner, the amount of random perturbation is significantly reduced, which in return will help preserve the classification model.

Given the matrices A, b and $\tilde{C}$, the combined matrix, $\Gamma_0$, is re-written as:

$$\Gamma_0 = \begin{bmatrix} b^T & d^T \\ A^T & \tilde{C}^T \end{bmatrix} + \begin{bmatrix} \varepsilon_b & 0 \\ \varepsilon_A & \varepsilon_C \end{bmatrix} \quad (1)$$
$$= \Gamma + \varepsilon,$$

where $\varepsilon_C = C^T - \tilde{C}^T$, $\varepsilon_A = \tilde{A}^T - A^T$, and $\varepsilon_b = \tilde{b}^T - b^T$ are the errors/noises in matrices C, A, and b, respectively. It is noted that $\varepsilon_A$ and $\varepsilon_C$ capture the noises of features while $\varepsilon_b$ captures the noises of class labels. The method defines two separate loss functions to penalize them. For the noises in features, a squared loss function is chosen, e.g., $$L_A(u, v) = \frac{1}{2}(u - v)^2,$$

for its simplicity and convexity. In contrast, since the sign of the soft label is more important than its numerical value, the method defines a (logarthimic) logit loss function $$L_b(u, v) = \frac{1}{\gamma} \log\{1 + \exp[-\gamma(uv)]\}$$

to emphasize the error on entries switching classes.

As the method accounts for the sensitive data items or features that may be noisy, given an example loss function for a feature, e.g., such as a numerical feature (e.g., numerical values (not categorical values), in one embodiment, the method defines the squared loss function according to:

$$\mathcal{L}_A(A, \tilde{A}) = \sum_i \sum_j (A_{ij} - \tilde{A}_{ij})^2$$

where $A_{ij}$ and $\tilde{A}_{ij}$ represent the feature matrix and low-ranked feature matrix, respectively, and i and j are an entry into the i-th row and j-th column of the feature set matrices $A_{ij}$ and $\tilde{A}_{ij}$. For a discrete Label set, a logit Loss function in one embodiment is defined as:

$$\mathcal{L}_b(b, \tilde{b}) = \sum_i \sum_j \frac{1}{\gamma} \log\{1 + \exp[-\gamma(b_{ij}\tilde{b}_{ij})]\}$$

where $\tilde{b}$ and $\tilde{b}_{ij}$ represent a class and low-rank class label vector set, and $\gamma$ is a specified variable. In one embodiment, the variable $\gamma$ is set to a value of 1 (which leads to a standard logistic loss function).

Combining the above ideas, the framework 200 to simultaneously "denoise" (i.e., extraction of a clean signal from a mixture of signal and nosie) the sensitive data (e.g., sensitive image data) and learn the masked image features and class labels, is formulated as an objective function according to:

$$\min_{C,d,\tilde{A},\tilde{b}} \mu \left\| \begin{bmatrix} \tilde{b} & d \\ \tilde{A} & C \end{bmatrix} \right\|_* + \mathcal{L}_A([A, \tilde{C}], [\tilde{A}, C]) + \lambda \mathcal{L}_b(b, \tilde{b})$$

where the first term of the objective function ensures that the masked data also share the same model, the second term learns the denoised data features; and the third term learns the denoised data labels.

Figure 4:
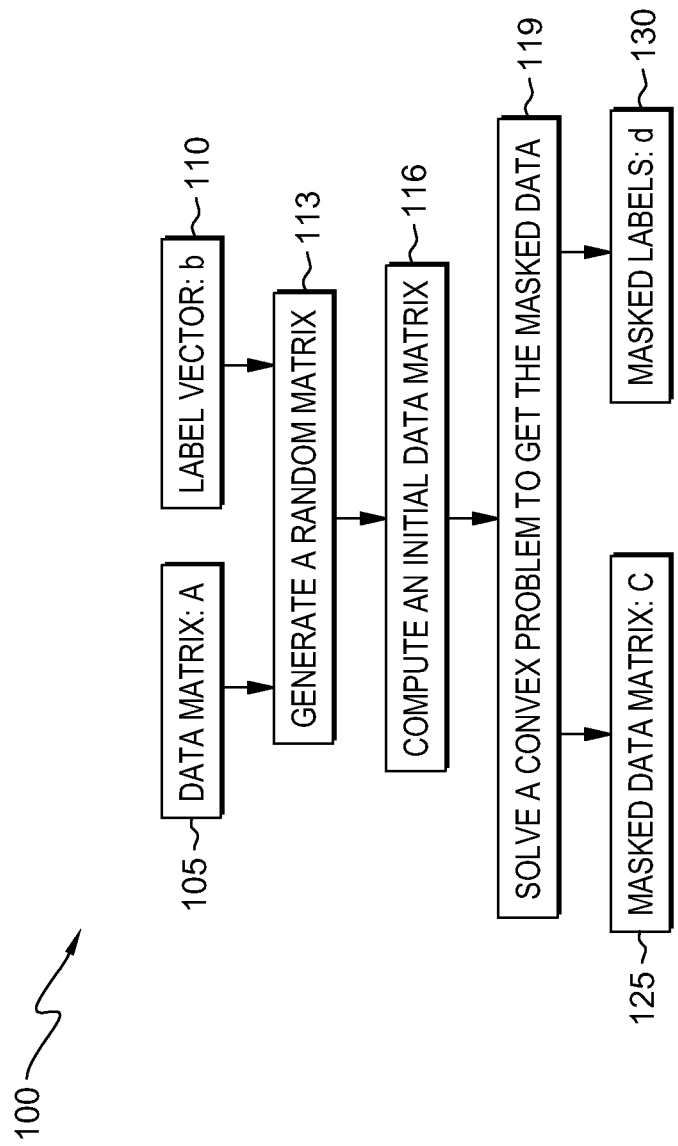
FIG. 4 shows a block diagram of the method for preserving privacy in one embodiment.

FIG. 4 shows a conceptual block diagram of the method 100 for preserving privacy in one embodiment. As mentioned, in FIG. 2, each entity's computing device 21a, 21b, . . . , 21n (or at devices employed at a trusted agent associated with the entity) may generate the respective masked feature and label data set at (or for) that entity, e.g., a hospital, financial institution, government agency. Each computing or processing device is programmed to employ the method and each implement like software functions, routines and procedures of the privacy and modeling preserved framework 200 to solve the complex objective function and generate matrix data feature set C and labels set d.

The programmed computing device runs method 100 to receive input data: including at 105 a set of sensitive items to be classified, e.g., sensitive images to be classified, and including the matrix A (is the set of features including, e.g., a visual feature, an image, a medical data, etc.) and n are the number of items being classified. Additional inputs received include, at 110, the data representing sensitive feature and labels to be classified: where the data is the vector b including the set of corresponding labels for the features (e.g., a class label vector).

Then, the method includes, at 113, FIG. 4, generating or invoking a generated random feature matrix P is generated that shares the same subspace as the noisy sensitive features of original data matrix A. At 116, the computing or processing device computes the initial data matrix $\tilde{C}$ according to: $\tilde{C}=AP$. This is an initial masked feature data matrix $\tilde{C}$ used in solving for the masked data set C. Finally, there are computed the low-rank soft data matrices, vectors and loss functions, used in the formation of the convex objective function used in the computation of C. These data structures include low-rank soft feature matrix $\tilde{A}$ which, in one embodiment, includes the observed feature matrix A with entries having added Gaussian noise, and includes the computed soft class labels $\tilde{b}$. The formed matrix $\tilde{A}$ and $\tilde{b}$ are the denoised features and class labels of the sensitive data. Then, at 119, the computing or processing device implements the functions, sub-routines and procedures to obtain the masked data matrix C and masked data labels d by solving (minimizing) the convex optimization problem to simultaneously denoise the sensitive image data and learn the masked image features and class labels, is formulated as an objective function (of a convex optimization problem) according to:

$$\min_{C,d,\tilde{A},\tilde{b}} \mu \left\| \begin{bmatrix} \tilde{b} & d \\ \tilde{A} & C \end{bmatrix} \right\|_* + \mathcal{L}_A([A, \tilde{C}], [\tilde{A}, C]) + \lambda \mathcal{L}_b(b, \tilde{b})$$

wherein, the loss function for a feature, $\mathcal{L}_A$ and the logistic Loss function $\mathcal{L}_B$, in one embodiment, are defined above and $\mu$ and $\lambda$ are parameters used to balance the trade-off between the three terms. These values may be experimentally determined using "cross-validation" technique whereby parameters are chosen based on the best classification performance tested using different parameter values.

From the optimal solution of the convex objective function at 119, output there is obtained the masked feature set C at 125 and corresponding masked feature labels d at 130. This data, corresponding to the sensitive data maintained by the entity, may be subsequently communicated for use to train the classifier model. It is guaranteed that the sensitive data cannot be recovered. It is understood that the masked feature set C and corresponding masked feature labels d can be obtained using Matlab tools for solving objective functions of this type.

FIG. 5A shows an example image (sensitive images) from which original feature matrices data set would be derived. This example shows numeric features 80a, 80b corresponding to a number "2" and numeric features 82a, 82b corresponding to the number "7". That is, for purposes of generating a classification model, a corresponding label 84 would be assigned to the sensitive image features 80a, 802b while a corresponding label 86 would be assigned to the sensitive image features 82a, 82b.

FIG. 5B shows example resulting images 90a, 90bencrypted according to the method 100 of FIG. 4. These images 90a, 90b correspond to the original sensitive numeric features 80a, 80bcorresponding to the number "2". Further shown are resultant images 92a, 92b that correspond to the original sensitive numeric features 82a, 82b that correspond to the number "7". For purposes of generating a classification model, a corresponding masked feature label 94 would be generated in the objective function solution that corresponds to the original label 84, while a corresponding masked feature label 96 would be generated in the objective function solution that corresponds to the originally assigned label 86.

It is understood that the sensitive features and labels of FIG. 5A cannot be reliably recovered even when both the masked data of FIG. 5B and the learning algorithm are known. Additionally, in an example scenario, even though a learner may knows C and d, as well as all except one sensitive records, the learner still cannot recover the only unknown sensitive record.

The system casts the data sharing problem into a convex-optimization problem, which can be solved very efficiently. The system can handle the issue when none of the data owners has enough data to learn an accurate model. The system is robust to noises in the original data.

This data, corresponding to the sensitive data maintained by the entity, may be subsequently communicated for use to train the classifier model. It is guaranteed that the sensitive data cannot be recovered.

Figure 6:
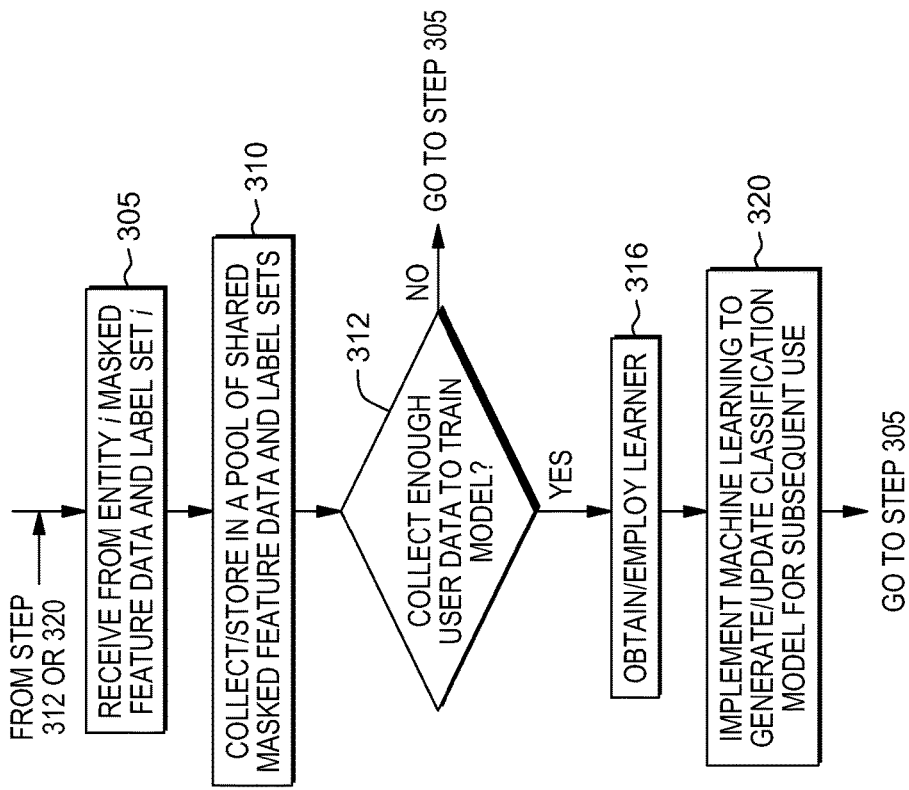
FIG. 6 shows a method 300 for processing the masked data and generating the classification model.

FIG. 6 shows a method 300 for processing the masked data and generating the classification model. In one embodiment, the method may be implemented at a data center associated with learner, for example. In one aspect, from the output solution of the convex optimization problem, as the columns of [d; C] lie in the subspace spanned by the column space of [$\tilde{b}$; $\tilde{A}$], the masked data share the same classification model as the sensitive data. That is, it is guaranteed that the learned model is the same as the model learned from the pool of sensitive data.

Thus, in the method 300 for generating the classification model, at 305, there is the step of receiving from an entity i, e.g., a hospital, masked feature data set C and masked feature label d; and at 310, the method stores the received masked feature data and feature label sets in a database and forms a collection or shared pool of sets of masked feature data and feature label sets received from the same or other entities. Then there is performed at 312, a determination as to whether there has been collected enough shared data sufficient to train the classification model. If not, the system waits until further masked feature data sets C and corresponding masked feature labels d are received. Otherwise, at 312, if it is determined that there is enough data for the classification, or alternatively, if the data classification model is being updated with newly received mask data, the process proceeds to step 316 where the learner is consulted to perform the modeling. Once the learner is approached and obtained, at 320, the method implements a machine learning program to generate (or train) the classification model for subsequent use. In one embodiment, training may implement supervised learning methods such as classification algorithms like support vector machine (SVM) and logistic regression. As the model may be continually updated, the method implemented 300 will return to 305 to wait for further inputs, in which the process steps 305, 310, 312, 316, 320 are repeated.

In one embodiment, the methods herein may be run on a computer, or any equipment that is designed for data acquisition, transferring, sharing and storage. Such equipment can integrate the method herein to prevent privacy leakage while maintaining the usability of the data. Exemplary types of equipment that may be provisioned with the methods herein include, but are not limited to, the following: Credit card reader for capture transaction information; Smart phone/camera/camcorders that records the audio and visual information of daily activities; cloud computing facility that performs data analytics; hard disk or data warehouse that stores data; and sensor networks that are used for recording any confidential information In summary, the present system and methods may be implemented to meet the need for privacy preserving in any modern data analytics platform.

Figure 7:
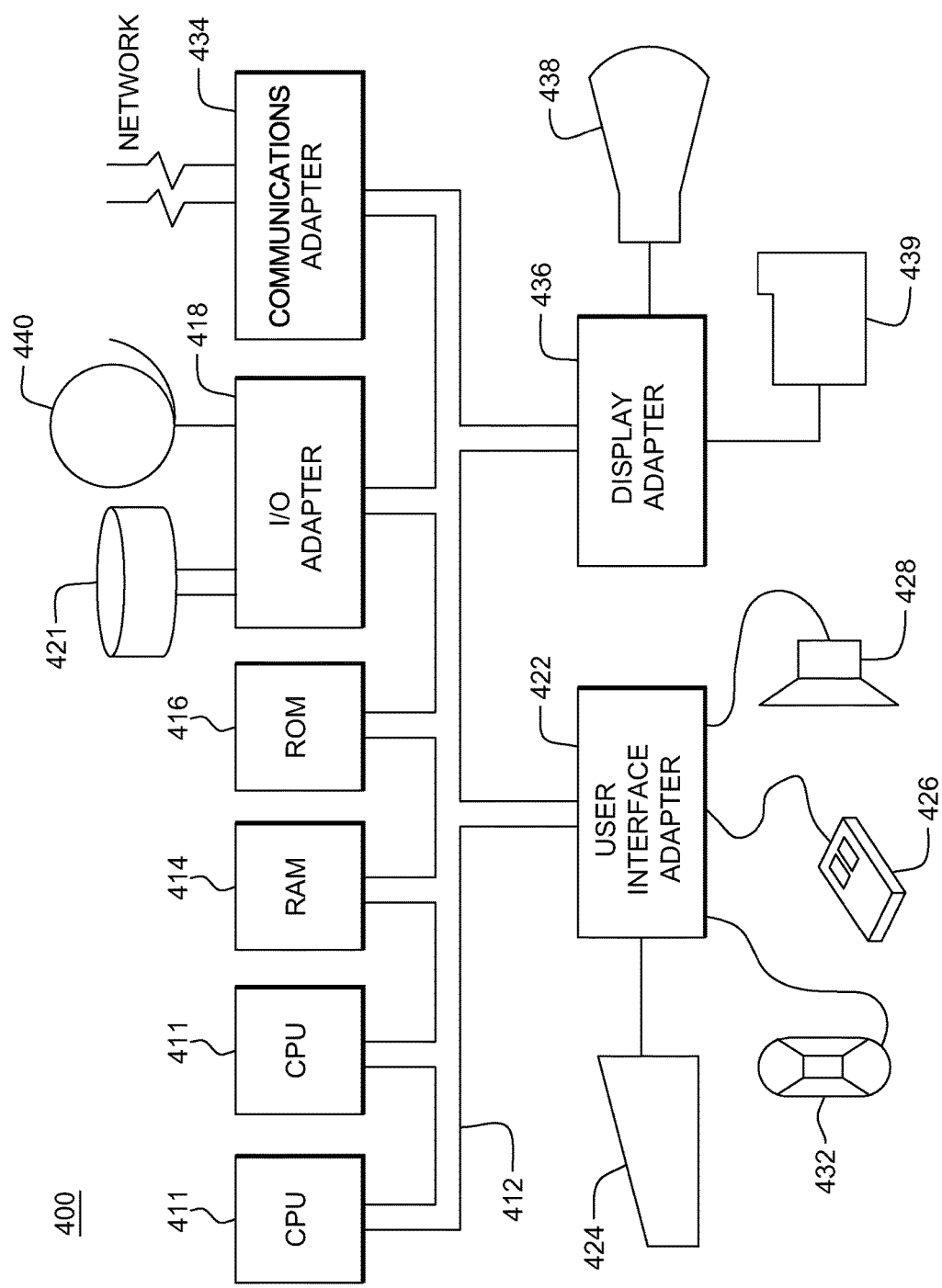
FIG. 7 illustrates one embodiment of an exemplary hardware configuration of a computing system programmed to perform the method steps for privacy and model preservation in the manner as described herein with respect to FIGS. 4-6.

FIG. 7 illustrates one embodiment of an exemplary hardware configuration of a computing system 400 programmed to perform the method steps for privacy and model preservation in the manner as described herein with respect to FIGS. 4-6. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating a classification model of original sensitive data that is private to a data owner comprising:
    a memory storage device;
    a first hardware processor configured to be in communication with the memory storage device, the first hardware processor being configured to train a first classification model using original sensitive data and unsensitive data of one or more records;
    a second hardware processor in communication with the first hardware processor, the second hardware processor being configured to:
        generate an original data matrix that represents the original sensitive data, wherein the original data matrix includes a set of sensitive features and a feature label set for use in training the first classification model and classifying the original sensitive data;
        generate a random feature matrix sharing a same subspace as a column space of the set of sensitive features of the original data matrix, such that the random feature matrix includes elements that lie in the same subspace as the column space of the set of sensitive features;
        compute one or more intermediate data structures, wherein each intermediate data structure corresponds to a product of original data matrix of a record and the random feature matrix that shares the same subspace as the column space of the sensitive features of the original matrix;
        form a convex optimization problem having an objective function based on the original data matrix, the corresponding feature label set, and the one or more intermediate data structures;
        solve the convex optimization problem to generate one or more masked data sets, wherein each masked data set includes masked data and a masked feature label set for use in classifying the masked data, the masked data is different from the original sensitive data, and the masked feature label set is different from the feature label set;
        send the masked data sets comprising the masked data and the masked feature label set to the first hardware processor;
    the first hardware processor being further configured to:
        input the masked data and the masked feature label sets into a machine learning program, wherein the masked data and masked feature label sets provide an amount of datasets, in addition to the unsensitive data of the one or more records, that is used to train a second classification model; and
        implement the machine learning program to train the second classification model based on the masked data, the masked feature label sets, and the unsensitive data, wherein the second classification model classifies the masked data, and wherein the second classification model is the same as the first classification model trained from the original sensitive data and the unsensitive data, the original sensitive data is hidden from the second classification model, and the original sensitive data and feature label set cannot be recovered even when the masked data, the masked feature label set, and a classification model of the masked data are known.

2. The system of claim 1, wherein to compute the one or more intermediate data structures, the hardware processor is further configured to:
    compute a low-rank soft feature data matrix and a corresponding soft class labels vector, wherein the low-rank soft feature data matrix includes denoised features and class labels of the original sensitive data, and the low-rank soft feature data matrix includes entries that include the original data matrix with an added noise component.

3. The system of claim 1, wherein to compute the one or more intermediate data structures, the hardware processor is further configured to:
compute a first loss function for a feature according to:

$$\mathcal{L}_A(A, \tilde{A}) = \sum_i \sum_j (A_{ij} - \tilde{A}_{ij})^2$$

where $A_{ij}$ and $A\tilde{A}_{ij}$ represent a feature matrix A and a low-ranked feature matrix, respectively, and i and j are indices into the respective feature set matrices; and
compute a second loss function according to:

$$\mathcal{L}_b(b, \tilde{b}) = \sum_i \sum_j \frac{1}{\gamma} \log\{1 + \exp[-\gamma(b_{ij}\tilde{b}_{ij})]\}$$

where $\tilde{b}$ and $\tilde{b}b_{ij}$ represent a class and a low-rank class label vector set, respectively, and $\gamma$ is a variable.

4. The system of claim 3, wherein the hardware processor is configured to form the convex optimization problem as an objective function according to:

$$\min_{C,d,\tilde{A},\tilde{b}} \mu \left\| \begin{bmatrix} \tilde{b} & d \\ \tilde{A} & C \end{bmatrix} \right\|_* + \mathcal{L}_A([A, \tilde{C}], [\tilde{A}, C]) + \lambda \mathcal{L}_b(b, \tilde{b})$$

where a matrix A is the set of sensitive features to be classified, b is a class label vector including the set of corresponding labels for the sensitive features of matrix A, $\tilde{C}$ is the intermediate data structure according to: $\tilde{C}=AP$, where P is said generated random feature matrix, and $\tilde{A}$ is said computed low-rank soft feature data matrix having said denoised features and $\tilde{b}$ is a corresponding soft class labels vector, wherein $\mu$ and $\lambda$ are parameter values, and
where C is the resulting masked data set and d is the masked data labels obtained by minimizing the convex objective function for use in training said classifier model.

5. A system for encrypting original sensitive data that is private to a data owner, said system comprising:
a memory storage device;
a hardware processor in communication with said memory storage device, the hardware processor configured to perform a method to:
access, from a computing device associated with a first entity, one or more records, wherein each record includes original sensitive data and unsensitive data;
generate an original data matrix that represents the original sensitive data, wherein the original data matrix includes a set of sensitive features and a corresponding feature label set for use in training a first classification model and classifying the original sensitive data, the training of the first classification model further uses the unsensitive data;
generate a random feature matrix sharing a same subspace as a column space of the set of sensitive features of the original data matrix, such that the random feature matrix includes elements that lie in the same subspace as the column space of the set of sensitive features;
compute one or more intermediate data structures, wherein each intermediate data structure corresponds to a product of original data matrix of a record and the random feature matrix that shares the same subspace as the column space of the sensitive features of the original matrix;
form a convex optimization problem having an objective function based on the original data matrix of original data content, the corresponding feature label set, and the one or more intermediate data structures; and
solve the convex optimization problem to generate one or more masked data sets including masked data and masked feature label set for use in classifying the masked data, wherein the masked feature label set is different from the feature label set for use in classifying the original sensitive data, the masked feature label set is different from the feature label set, and the masked data and the masked feature label set provide an amount of datasets, in addition to the unsensitive data of the one or more records, that is used by a machine learning program to train a second classification model that is the same as the first classification model trained from the original sensitive data and the unsensitive data, and the original sensitive data and feature label set cannot be recovered even when the masked data, the masked feature label set, and a classification model of the masked data are known.

6. The system of claim 5, wherein to compute the one or more intermediate data structures, the hardware processor is further configured to:
compute a low-rank soft feature data matrix and a corresponding soft class labels vector, wherein the low-rank soft feature data matrix includes denoised features and class labels of the original sensitive data, and the low-rank soft feature data matrix includes entries that include the original data matrix with added noise component.

7. The system of claim 6, wherein to compute the one or more intermediate data structures, the hardware processor is further configured to:
compute a first loss function for a feature according to:

$$\mathcal{L}_A(A, \tilde{A}) = \sum_i \sum_j (A_{ij} - \tilde{A}_{ij})^2$$

where $A_{ij}$ and $\tilde{A}_{ij}$ represent a feature matrix A and low-ranked feature matrix, respectively, and i and j are indices into the respective feature set matrices; and
compute a second loss function according to:

$$\mathcal{L}_b(b, \tilde{b}) = \sum_i \sum_j \frac{1}{\gamma} \log\{1 + \exp[-\gamma(b_{ij}\tilde{b}_{ij})]\}$$

where $\tilde{b}$ and $\tilde{b}_{ij}$ represent a class and low-rank class label vector set, respectively, and $\gamma$ is a variable.

8. The system of claim 7, wherein the formed convex optimization problem is formulated as an objective function according to:

$$\min_{C,d,\tilde{A},\tilde{b}} \mu \left\| \begin{bmatrix} \tilde{b} & d \\ \tilde{A} & C \end{bmatrix} \right\|_* + \mathcal{L}_A([A, \tilde{C}], [\tilde{A}, C]) + \lambda \mathcal{L}_b(b, \tilde{b})$$

where a matrix A is the set of sensitive features to be classified, b is a class label vector including the set of corresponding labels for the sensitive features of matrix A, $\overline{C}$ is the intermediate data structure according to $\overline{C}=AP$, where P is said generated random feature matrix, and $\tilde{A}$ is said computed low-rank soft feature data matrix having said denoised features and $\tilde{b}$ is a corresponding soft class labels vector, where μ and λ are parameter values, and where C is the resulting masked data set and d is the masked data labels obtained by minimizing the convex objective function for use in training said classifier model.

9. A computer program product for generating a classification model using original sensitive data that is private to a data owner, the computer program product comprising a computer readable storage medium having program instructions embodied therewith, the program instructions are executable by a device to perform a method, the method comprising:

accessing, from the one or more computing devices, one or more records, wherein each record includes original sensitive data and unsensitive data;

generating an original data matrix that represents the original sensitive data, wherein the original data matrix includes sensitive features and the feature label set for use in training a first classification model and classifying the original sensitive data, the training of the first classification model further uses the unsensitive data;

generating a random feature matrix sharing a same subspace as a column space of the set of sensitive features of the original data matrix, such that the random feature matrix includes elements that lie in the same subspace as the column space of the set of sensitive features;

computing one or more intermediate data structures, wherein each intermediate data structure corresponds to a product of original data matrix of a record and the random feature matrix that shares the same subspace as the column space of the sensitive features of the original matrix;

forming a convex optimization problem having an objective function based on the original data matrix of original data content, said corresponding feature label set, and the one or more intermediate data structures;

solving the convex optimization problem to one or more masked data sets, wherein each masked data set includes masked data and masked feature label set for use in classifying the masked data, the masked data is different from the original sensitive data, and the masked feature label set is different from the feature label set;

inputting the masked data and the masked feature label sets into a machine learning program, wherein the masked data and masked feature label sets provide an amount of datasets, in addition to the unsensitive data of the one or more records, that is used to train a second classification model; and implementing the machine learning program, to train the second classification model from the masked data, the masked feature label sets, and the unsensitive data, wherein the second classification model classifies the masked data, and wherein the second classification model is the same as the first classification model trained from the original sensitive data and the unsensitive data, and the original sensitive data is hidden from the second classification model, and the original sensitive data and feature label set cannot be recovered even when the masked data, the masked feature label set, and a classification model of the masked data are known.

10. The computer program product of claim 9, wherein said computing one or more intermediate data structures comprises:

computing a low-rank soft feature data matrix and corresponding soft class labels vector, wherein the low-rank soft feature data matrix includes denoised features and class labels of the original sensitive data.

11. The computer program product of claim 10, wherein the low-rank soft feature data matrix includes entries that include the original data matrix with an added noise component.

12. The computer program product of claim 11, wherein said computing one or more further intermediate data structures comprises:

computing a first loss function for a feature according to:

$$\mathcal{L}_A(A, \tilde{A}) = \sum_i \sum_j (A_{ij} - \tilde{A}_{ij})^2$$

where $A_{ij}$ and $\tilde{A}_{ij}$ represent a feature matrix A and low-ranked feature matrix, respectively, and i and j are indices into the respective feature set matrices; and computing a second loss function according to:

$$\mathcal{L}_b(b, \tilde{b}) = \sum_i \sum_j \frac{1}{\gamma} \log\{1 + \exp[-\gamma(b_{ij}\tilde{b}_{ij})]\}$$

where $\tilde{b}$ and $\tilde{b}_{ij}$ represent a class and low-rank class label vector set, respectively, and γ is a variable.

13. The computer program product of claim 12, wherein said formed convex optimization problem is formulated as an objective function according to:

$$\min_{C,d,\tilde{A},\tilde{b}} \mu \left\| \begin{bmatrix} \tilde{b} & d \\ \tilde{A} & C \end{bmatrix} \right\|_* + \mathcal{L}_A([A, \tilde{C}], [\tilde{A}, C]) + \lambda \mathcal{L}_b(b, \tilde{b})$$

where a matrix A is the set of sensitive features to be classified, b is a class label vector including the set of corresponding labels for the sensitive features of matrix A, $\overline{C}$ is the intermediate data structure according to: $\overline{C}=AP$, where P is said generated random feature matrix, and $\tilde{A}$ is said computed low-rank soft feature data matrix having said denoised features and $\tilde{b}$ is a corresponding soft class labels vector, μ and λ are parameter values, and where C is the resulting masked data set and d is the masked data labels obtained by minimizing the convex objective function for use in training said classifier model.

14. The system of claim 1, wherein the masked data is randomly initialized to cause the original sensitive data to be preserved.

15. The system of claim 1, wherein the random feature matrix is a normalized random matrix whose entries take binary values with equal probability.

* * * * *